O. E. KOPPLIN.
PLOW.
APPLICATION FILED MAY 23, 1918. RENEWED MAR. 6, 1919.
1,301,063.
Patented Apr. 15, 1919.
6 SHEETS—SHEET 1.
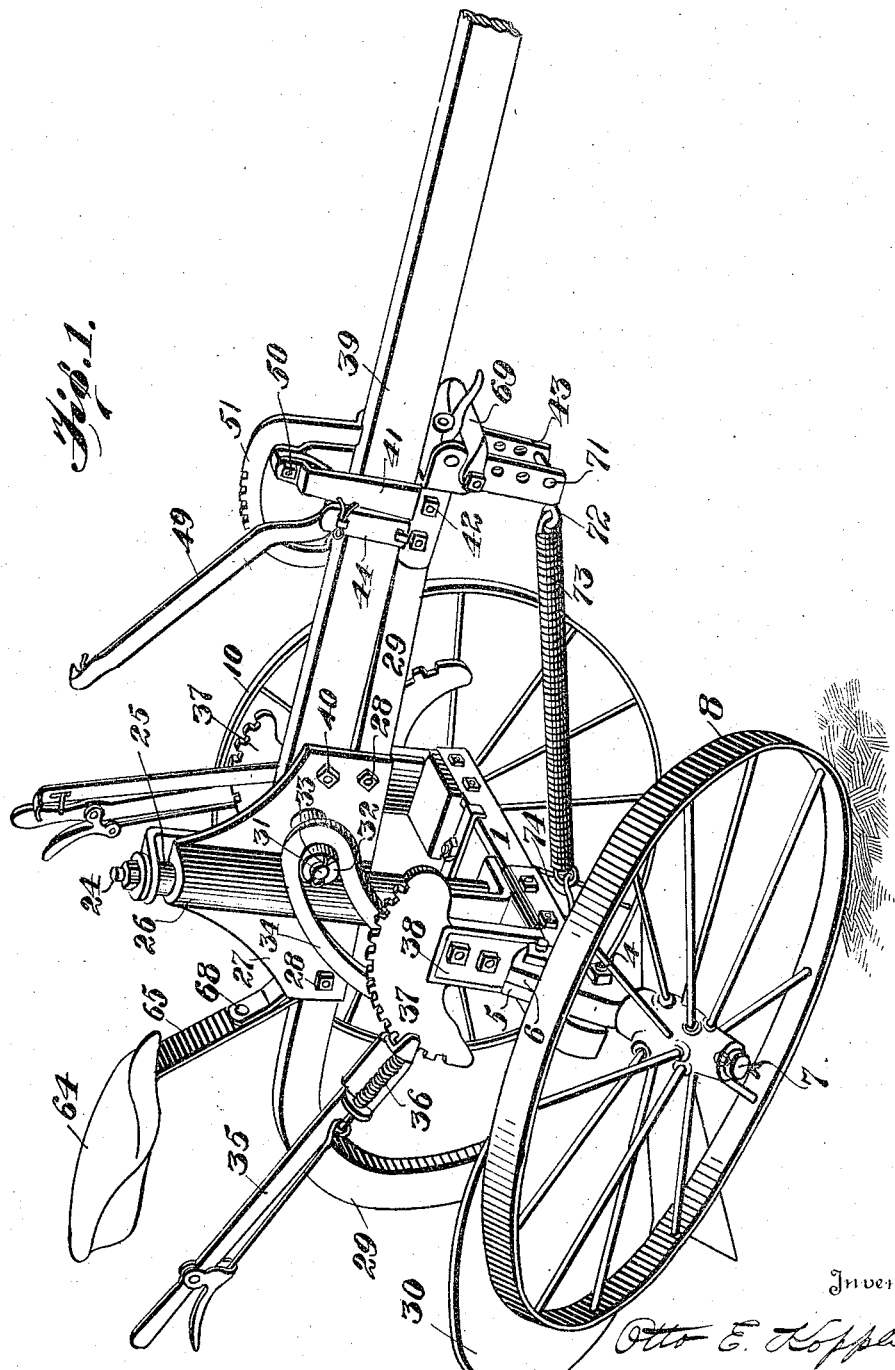

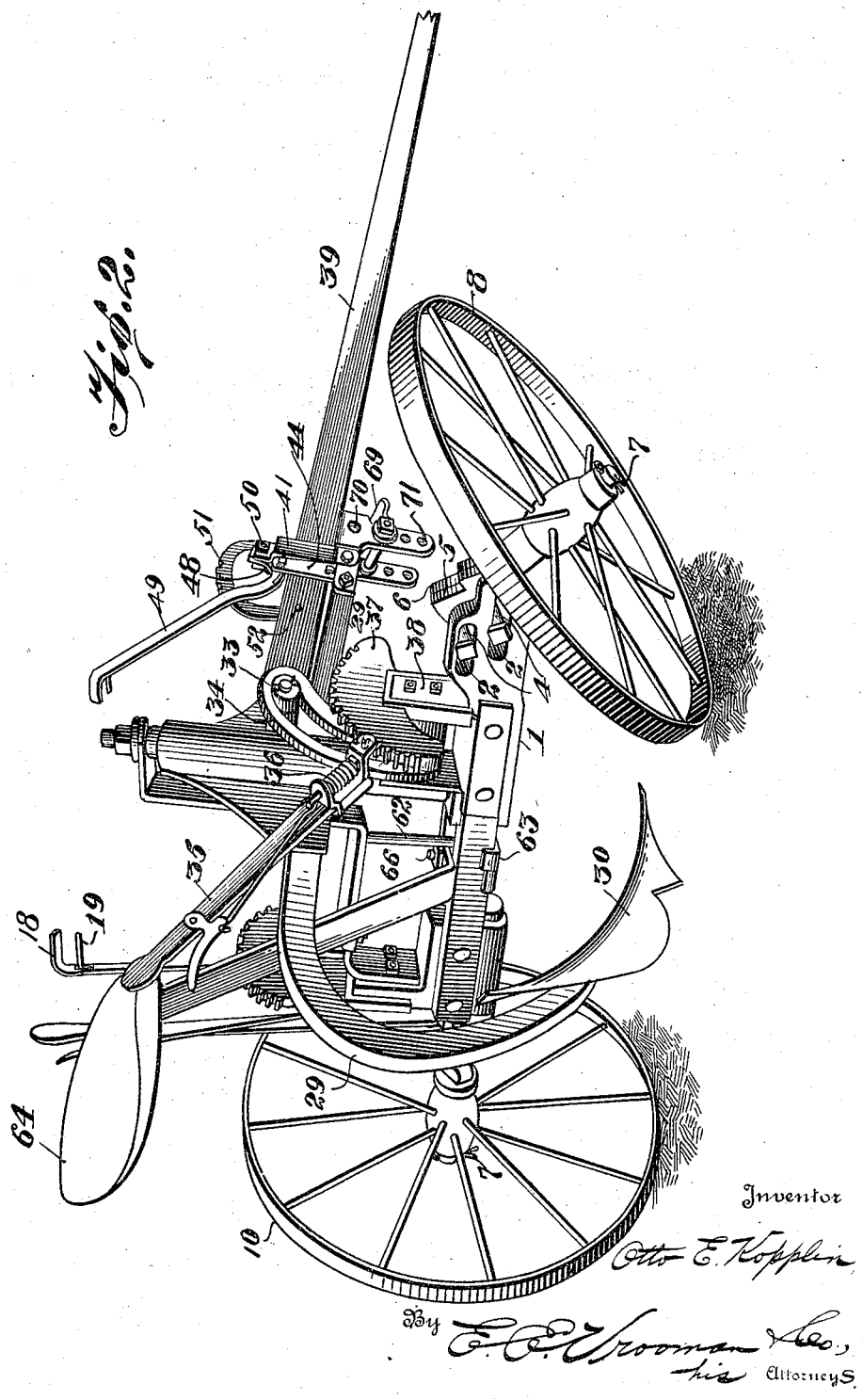

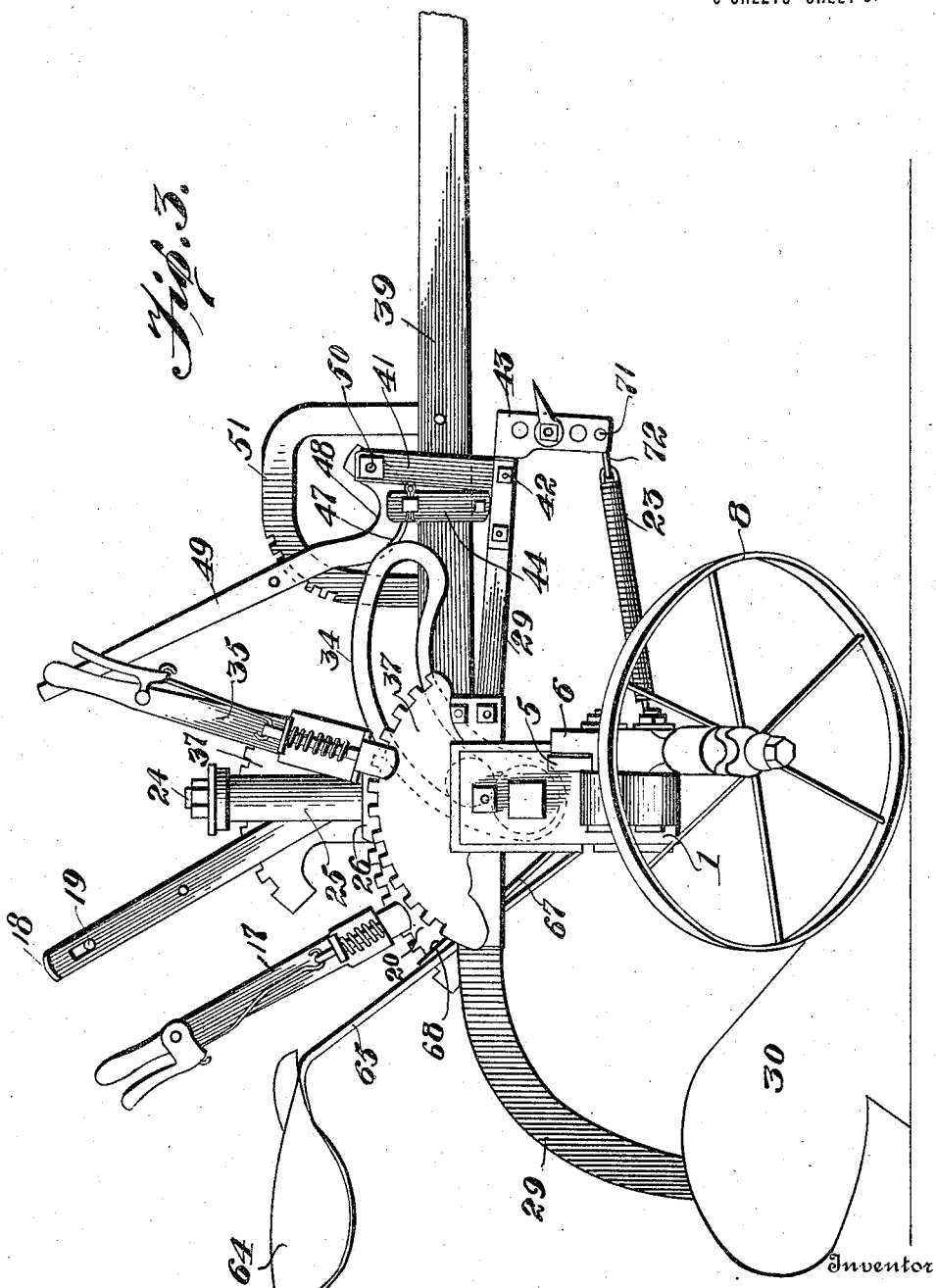

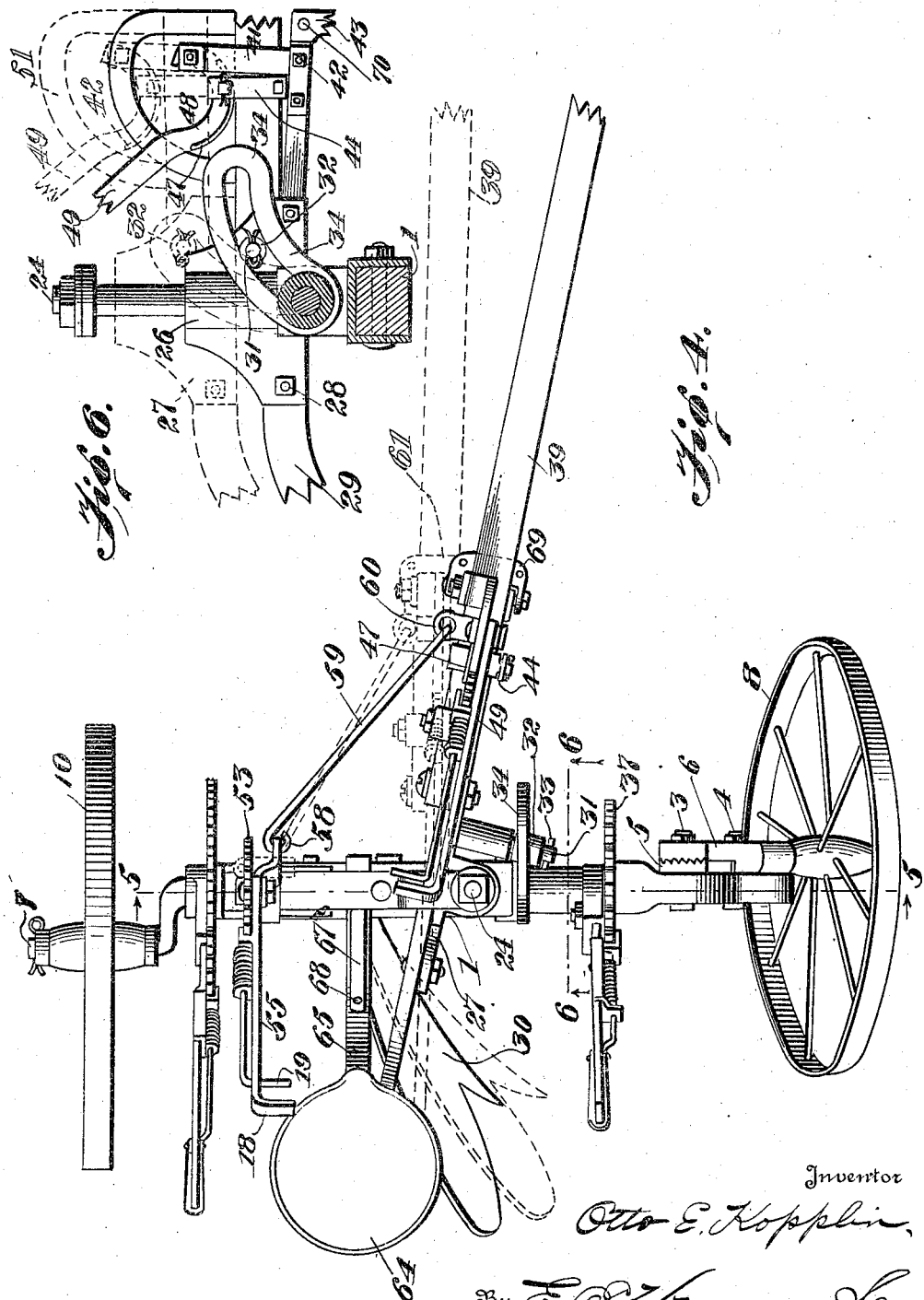

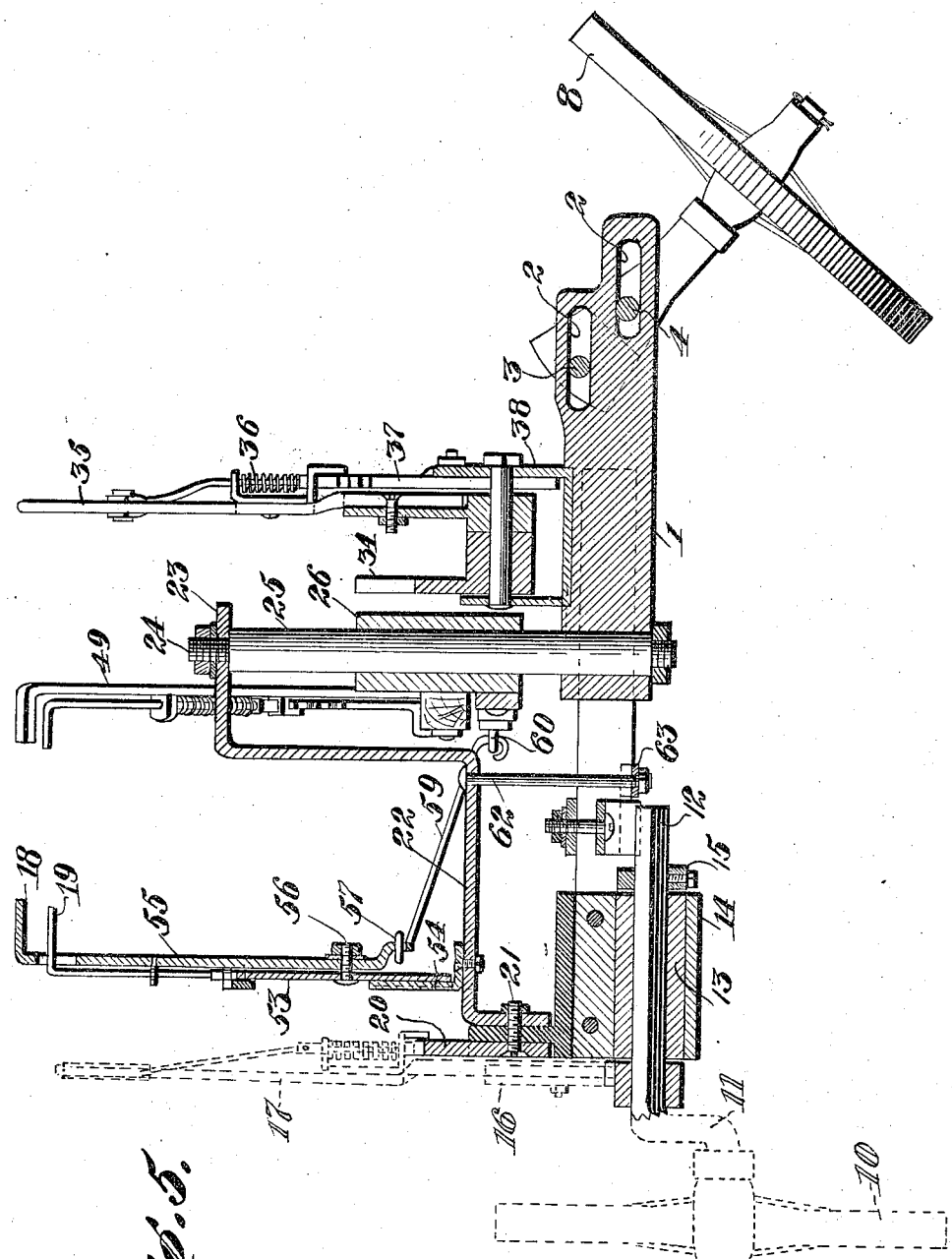

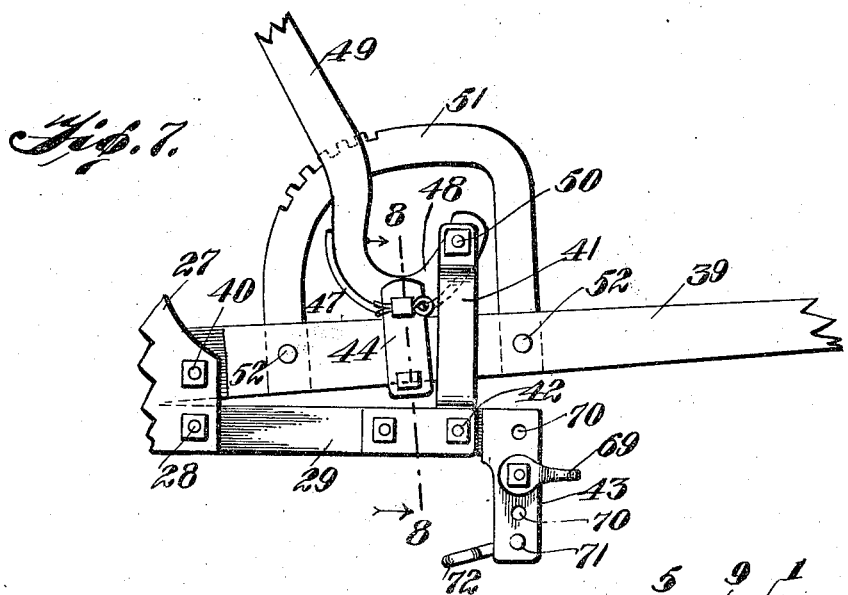
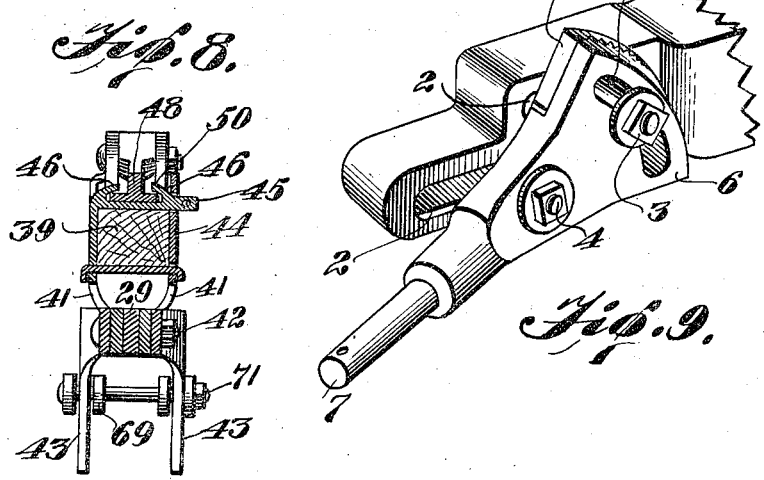

UNITED STATES PATENT OFFICE.

OTTO E. KOPPLIN, OF MARION, TEXAS.

PLOW.

1,301,063.　　　　　　Specification of Letters Patent.　　Patented Apr. 15, 1919.

Application filed May 23, 1918, Serial No. 236,197. Renewed March 6, 1919. Serial No. 281,061.

*To all whom it may concern:*

Be it known that I, OTTO E. KOPPLIN, born in Germany, but since four years old and for over thirty-four years a resident of Marion, in the county of Guadalupe and State of Texas, have invented certain new and useful Improvements in Plows, of which the following is a specification, reference being had therein to the accompanying drawings.

This invention relates to improvements in plows, and has for its object the construction of a simple, durable, and efficient plow that embodies a number of adjusting devices for adapting the plow to a nicety to perform its functions to accomplish the best results.

With this and other objects and advantages in view, my invention consists of certain novel constructions, combinations, and arrangements of parts, as will be hereinafter fully described and claimed.

In the drawings:

Figure 1 is a perspective view of a plow constructed in accordance with the present invention.

Fig. 2 is a perspective view of the plow looking at the rear thereof.

Fig. 3 is a view, in side elevation, of my plow.

Fig. 4 is a top plan view of my plow.

Fig. 5 is a sectional view taken on line 5—5, Fig. 4 and looking in the direction of the arrows.

Fig. 6 is a sectional view taken on line 6—6, Fig. 4, and looking in the direction of the arrows.

Fig. 7 is a fragmentary view, in side elevation, showing particularly the tongue vertically adjusting device.

Fig. 8 is a sectional view taken on line 8—8, Fig. 7, and looking in the direction of the arrows.

Fig. 9 is a fragmentary perspective view of the adjusting device for one of the wheels.

Referring to the drawings by numerals, 1 designates the frame of my plow that is provided, at the right-hand end, with a pair of horizontal, parallel, elongated slots 2, 2. In these slots 2, 2 are bolts 3 and 4, which bolts 3 and 4 are provided with the usual head and washers and nuts, as shown, for holding the inner ratchet plate 5 and the outer ratchet plate 6 secured to the frame 1. The outer ratchet plate 6 is provided with a stub-shaft 7, upon which is journaled the wheel 8. By reason of the slot 9, bolt 3 can be placed at different points of the slot 9, and upon tightening its nut, the outer ratchet plate 6 will press tightly against the inner ratchet plate 5, and will fasten the stub-shaft 7 in different inclined positions, thereby permitting the operator to increase or decrease the degree of inclination of the stub-shaft to increase or decrease the pitch or inclination of the right-hand wheel 8. It is to be understood that the bolts 3 and 4 may be adjusted longitudinally in the parallel slots 2, 2, whereby the wheel 8 may be positioned transversely of the frame 1 for placing the wheel near to or farther from the frame, as desired.

The left-hand wheel 10 is journaled upon a crank shaft 11, which crank shaft 11 is square, at its inner portion 12, and the square inner portion is retained in a sleeve 13, and sleeve 13 is journaled in the casing 14, which casing is fixedly secured to the frame 1. A suitable collar 15 is detachably secured upon the squared portion 12 of the crank axle 11, and the crank axle 11 can be rotated, through the medium of frame 16 and lever 17; the frame 16 is fixedly secured to the squared portion 12 of the crank axle 11, so that upon gripping the lever 17 and raising its ratchet from engagement with ratchet plate 20, the frame 1 can be lowered or raised with respect to the ground by causing the crank shaft 11 to be rotated upon the frame 1. The ratchet plate 20 of the left-hand adjusting device is bolted, at 21, to the frame structure, and this bolt 21 also secures the inner end of the angular bracket 22, fixedly secured upon the frame.

The bracket 22 has its upper end 23 overhanging the central part of the frame (Fig. 5) and this upper end 23 of the primary bracket fits over the upper threaded end 24 of the central, vertical post 25, which post 25 has its lower end extending through the body of the frame 1, as shown. Slidably mounted upon the post 25 is a sleeve 26, that is integral with a plate 27, which plate 27 is bolted, at 28, to the plow beam 29. The lower end of the plow beam 29 carries a mold-board 30.

Secured to the plate 27 is a horizontal shaft 31, upon which shaft 31 is mounted the roller 32. The roller 32 is retained upon shaft 31, through the medium of a cotter pin 33. The roller 32 works in the slot of cam arm 34, which cam arm 34 is fixedly secured to the lever 35, and the lever 35 is provided with the usual spring-pressed catch device 36 that engages the ratchet plate 37. The plate 37 is fixedly secured to the up-standing extension 38 of the frame 1. By adjusting the lever 35 upon the ratchet plate 37, the cam arm 34 will be swung in a vertical plane causing the roller 32 to travel in said cam arm, thereby raising and lowering plate 27 and sleeve 26, which, in turn, will raise or lower the plow beam 29 with respect to the frame 1, so that a greater or less depth for the mold-board 30 will be obtained. By reason of the peculiar structure of the plow beam adjusting device, I found from actual experience that a very durable structure is obtained, since a minimum number of parts are involved, and which parts are strong and efficient.

The tongue 39 (Fig. 7) is pivotally connected by bolt 40 to the plate 27 and the tongue is positioned in a primary bracket 41 that is secured, at 42, to the front end of the plow beam 29. Also secured to the front end of the plow beam 29 is a clevis device 43. An auxiliary bracket 44 is positioned around the tongue 39 (Fig. 8) and the upper end of the bracket 44 is provided with an integral, horizontal extension 45, which extension 45 has a pair of inwardly-extending lips 46, which lips 46 fit over the flanged edges 47 of the curved lower end 48 of the tongue vertically-adjusting lever 49 (Fig. 7). The inner end of the lever 49 is pivotally connected to the bracket 44, by means of bolt structure 50, so that when lever 49 is shifted along the ratchet bracket 51, attached, at 52, to tongue 39 (Fig. 7) the flanged edges 47 will ride under lips 46 of the extension 50, whereby the tongue 39 may be vertically adjusted with respect to the plow beam 29. It will be understood that through the medium of the tongue adjusting lever 49 and its coöperating parts, an independent vertical adjustment of the tongue 39 is obtained, other than the bodily adjustment of the tongue with the bodily adjustment of the plow beam 29, when the lever 35 is operated, for lifting the entire plow beam 29, mold-board 30, and tongue 39, as previously described.

An auxiliary adjusting device for the tongue is provided in my plow, which involves a ratchet plate 53 (Fig. 5) that is secured, through the medium of bracket 54, to the primary bracket 22 (Fig. 5). The usual shifting lever 55 is pivotally mounted, at 56, upon the ratchet plate 53, and to the lower end of lever 55, at 57, is attached the hooked end 58 (Fig. 4) of link 59, the outer end of link 59 being also provided with a hook that is positioned in the eye plate 60, which plate 60 is attached to the plow beam 29, near its forward end, consequently, by shifting the lever 55 upon the ratchet plate 53, the lower end will cause the link 59 to swing the tongue 39 transversely of the plow, as clearly shown by dotted lines 61 (Fig. 4).

The primary bracket 22 is braced, near its middle, by a vertical bolt 62, which bolt 62 not only extends through bracket 22 (Fig. 5) but through frame 1, the lower end of bolt 62 extending through a transverse plate 63, thereby materially strengthening the entire bracket 22 by reason of making the structure rigid and thereby eliminating any play or unnecessary swinging of the bracket near its middle, as might be likely when plowing heavy or rocky ground.

A seat 64 is carried upon the upper end of seat-standard 65, which seat-standard is bolted, at 66, (Fig. 2) to the frame 1. The seat-standard 65 is braced by an auxiliary bar 67, which bar 67 is riveted, at 68, to seat-standard 65, and the lower end of the bracing bar 67 is suitably fastened to the frame 1.

The clevis device 43 is provided with the usual attaching device 69, which is adjustable upon the device, through the medium of the apertures 70 (Fig. 7).

In the lower aperture of the clevis device 43 (Fig. 7) is positioned a bolt 71, and attached to bolt 71, is an eye-bolt 72, and in this eye-bolt 72 is fastened one end of coil-spring 73, the other end of coil-spring 73 being attached to a hook 74, which hook is suitably attached to frame 1. The spring 73 exerts normally a downward pull upon the forward end of the plow beam 29, through the medium of the clevis device 43.

From the foregoing description, it is to be understood that I have provided a plow with independent devices for adjusting the wheels supporting the frame, and that I have also provided, on the frame 1, a bodily vertically adjustable device for the entire plow beam, mold-board and point, as well as the tongue. Further, it will be understood from the foregoing description, that I have provided an independent vertically adjustable device for swinging the tongue and also another device for swinging the tongue in a horizontal plane or transversely to the frame. These several devices enable me to accurately adjust my plow to all conditions of the land that is being plowed, whether it is heavy sod land or rocky soil, or whether I am plowing on hilly ground, or whether on perfectly flat planes.

It is to be understood that I reserve the right to make such alterations and modifications as may appear to one skilled in the art to which this invention relates, and which alterations and modifications shall fairly fall within the scope of the appended claims.

What I claim is:

1. In a plow, the combination with a plow beam, of a tongue pivotally supported upon said beam, a bracket on said plow beam through which said tongue extends, a bracket provided with overhanging lips carried by said tongue, and lever means pivotally connected to said first-mentioned bracket and adapted to slide under said lips for adjusting the tongue with respect to said plow beam.

2. In a plow, the combination with a plow beam, of a tongue pivotally supported upon said beam, a bracket surrounding said tongue and attached to said plow beam, a lever provided with a curved lower end, said curved lower end attached to said bracket, said lower end of the lever being provided with flanges, means carried by the tongue and engaging said flanges and permitting the curved lower end to slide therein when said lever is swung upon the tongue for raising or lowering said tongue with respect to said plow beam.

3. In a plow, the combination with a plow beam, of a plate carried by said plow beam, a tongue pivotally attached to said plate, a bracket secured to the front end of said plow beam and having said tongue extending therethrough, a lip-carrying bracket fastened to the plow beam near said first-mentioned bracket, a ratchet bracket fastened to the tongue and straddling said first-mentioned bracket and the lip-carrying bracket, and a lever provided with laterally-extending flanges pivotally connected at its lower end to said first-mentioned bracket and adapted to be adjusted upon said ratchet bracket for causing the flanges to slide under the lips of said lip-carrying bracket for vertically adjusting the tongue with respect to said plow beam.

In testimony whereof I hereunto affix my signature.

OTTO E. KOPPLIN.

Witnesses:
 HENRY TASTO,
 ELMER LOOFT.

Copies of this patent may be obtained for five cents each, by addressing the "Commissioner of Patents, Washington, D. C."